Dec. 11, 1923.

E. J. WILLIAMS

ASSEMBLING OF SHINGLES

Filed March 29 1922       2 Sheets-Sheet 1

1,476,746

Edward J. Williams
INVENTOR

BY
ATTORNEY

Dec. 11, 1923.

E. J. WILLIAMS 1,476,746

ASSEMBLING OF SHINGLES

Filed March 29, 1922   2 Sheets-Sheet 2

Edward J. Williams
INVENTOR

BY
ATTORNEY

Patented Dec. 11, 1923.

1,476,746

UNITED STATES PATENT OFFICE.

EDWARD J. WILLIAMS, OF RIVER EDGE, NEW JERSEY.

ASSEMBLING OF SHINGLES.

Application filed March 29, 1922. Serial No. 547,867.

*To all whom it may concern:*

Be it known that I, EDWARD J. WILLIAMS, a citizen of the United States, and a resident of River Edge, State of New Jersey, have invented a certain Improvement in Assembling of Shingles, of which the following is a specification.

The present invention relates to improved means for assembling and shipping shingles, whereby they are prepared for rapid, accurate and secure application to a roof or other surface.

In the shingling of roofs and other surfaces as at present carried out, much time is occupied in properly placing each shingle, and, unless the workman is very careful, the perfection of the job is marred by insecure nailing, careless omission of nails, splitting of individual shingles, etc. By employing the present invention, a whole row of shingles, or a large part of a row can be laid in place with perfect accuracy by a single movement, and, even if one or more nails are accidentally omitted, or become ineffective by breaking or splitting of the shingle, my invention supplies a permanent attachment which renders such accidents unimportant.

It is an important feature of the present invention that the advantages above mentioned are made available without any of the countervailing difficulties and disadvantages incident to the use of "strip singles" formed with a continuous web or backing.

Briefly stated, the subject matter of this invention comprises a plurality of shingles, however constructed, and whether made of wood or other material, placed edge to edge at the proper distance apart, and secured together by pliable strips, preferably of non-rusting metal, appropriately secured to the shingles themselves.

Figure 1:
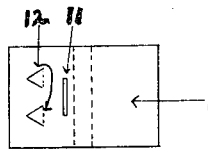
Figure 2:
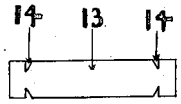
Figures 3, 4:
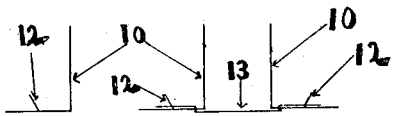
Figure 5:
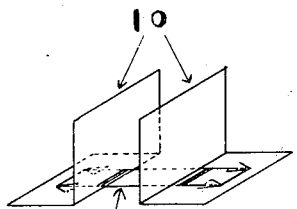
Figure 6:
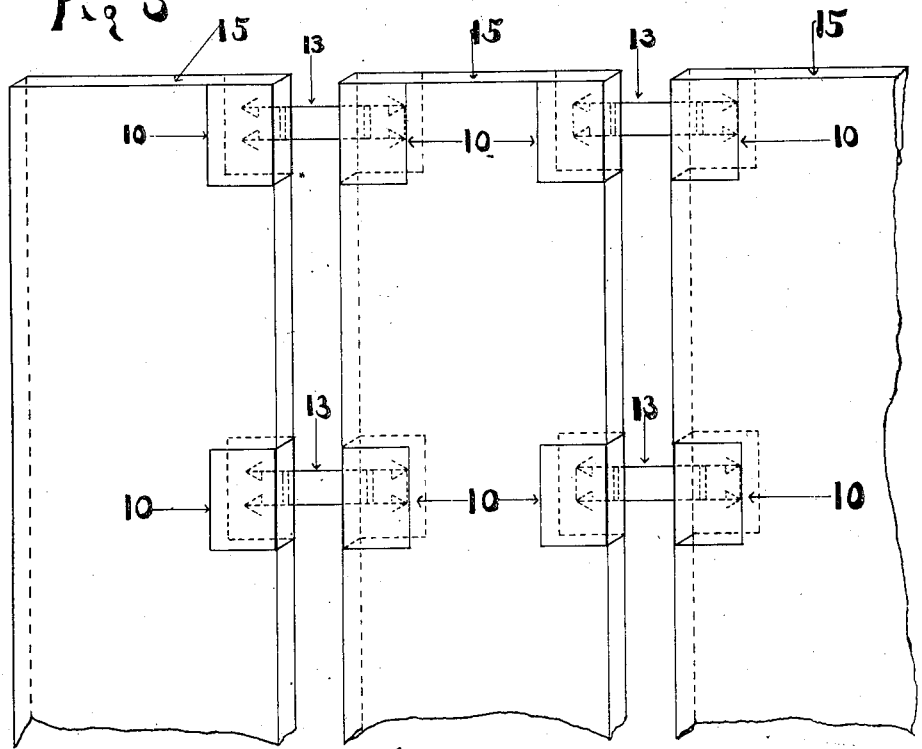
Figure 7:
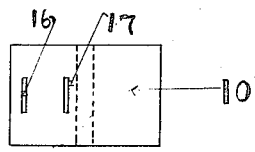
Figure 8:
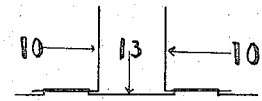
Figure 9:
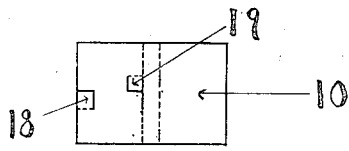
Figure 10:
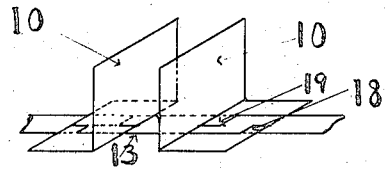
Figure 11:
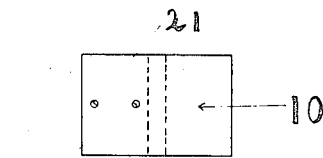
Figure 12:
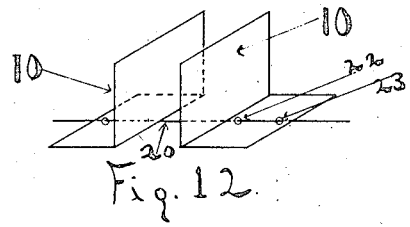
Figure 13:
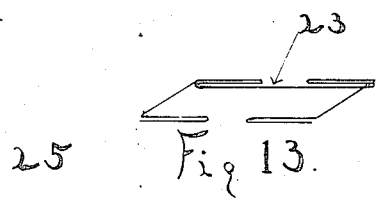
Figure 14:
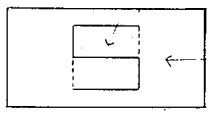
Figure 15:
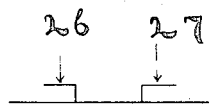

This general plan may be carried out in a variety of ways, and I have illustrated a number of modifications in the accompanying drawings wherein Figures 1 to 3 are diagrammatic representations of individual parts of a preferred union, Figure 4 is a similar view of an assembled union ready for application to the shingles, Figure 5 is a perspective view of the same, Figure 6 is a plan view of a portion of a shingle group united by the union shown in Figure 5, Figures 7 and 8 show diagrammatically a modified form of union, Figures 9 and 10 are similar views of another modification, Figures 11 and 12 are similar views of another modification, Fig. 13 is a perspective view of a one-piece wire union, and Figures 14 and 15 are diagrams showing another form of one-piece union.

The form of union shown in Figures 1 to 5 comprises two similar clipping plates, 10, as shown in Figure 1. Each plate has a narrow slot 11 and two angular struck-up portions or catches 12. The joining piece is a strip 13 (Figure 2) which may be made thinner and more pliable than the clipping plates 10. It is adapted to have its ends passed through the slots 11 in the two clipping plates, and these ends are provided with notches 14, adapted to engage the catches 12.

In constructing the union, each plate 10 is bent as in Figure 3, the ends of the strip 13 are passed through the slots 11 in the two plates 10, and the notches 14 are made to engage the catches 12. This produces the union as shown in Figures 4 and 5.

Figure 6 shows how these unions are applied to the contiguous edges of properly spaced shingles 15, preferably near or quite at the top of each edge and also a little lower down, as shown. The shingles are thus held the right distance apart and are kept parallel. The sides of the clipping plates 10 are firmly clamped down upon the edges of the shingles, and the strips 13 hold the shingles together. The catches 12 bite into the shingle and serve to aid friction in making the attachment secure.

By this means a group of any convenient number of shingles may be united, and this group may be folded by 180 degree turns in alternately opposite directions, bending the strips 13, and forming a compact package, easily secured and handled. In laying, it is only necessary to secure the end shingle of a group by a shingle nail at one end of a row, and then by a single movement pull the whole group straight in proper alignment on the roof or other surface. Every shingle will be in its proper place and the nails can be rapidly driven in successive shingles without paying any further attention to their placing. Even if, by accident a nail is omitted here and there, the unions will preserve the proper positions of the shingles. By this means a great deal of labor and time is saved.

As shown in Figures 7 and 8, the strip 13, may be bent up and then down through two slots 16 and 17 in each clipping plate 10, and when pressure is applied, a firm union will obviously be accomplished.

The clipping plates need not necessarily be slotted. As shown in Figures 9 and 10, each clipping plate, may have two securing flaps 18, 19, cut in it and bent upward, the clipping plates being slotted along the folding line shown in dotted lines. When the strip 13 is passed through these slots, the flaps 18 and 19 are bent down over opposite edges on both ends, as in Figure 10, and these flaps then secure the parts together.

If desired, the securing strip may be a mere wire 20, as in Figures 11 and 12. Here the wire is run first up and then down through holes 21, 22, in the two clipping plates, and when pressure is applied, the connection is completed.

If desired, the union may be all in one piece. For instance a single wire may be bent so as to form two clips and a connecting piece, as at 23 in Figure 13. Application to the shingles will be by pressure as before.

Another one piece union is shown in Figures 14 and 15. Here a plate 24 is used. Between the dotted lines in Figure 14, this plate is cut through along the rectangularly disposed lines shown full in the figure at 25. This will form two flaps 26, 27, in the middle, which can be folded back, as in Figure 15. The two outer edges of the plate, between the dotted lines in Figure 14 will then take the place of the strip 13, and will hold the shingles together when their edges are clamped down under the flaps 26 and 27.

The principle of this invention may be embodied in various other forms, and I do not limit myself to the details herein shown and described.

What I claim is—

1. As an article of manufacture, a shingle group comprising a plurality of spaced shingles placed edge to edge united by metallic unions independent of the material of the shingles attached to contiguous edges of the shingles, said unions being pliable where they cross the spaces between adjacent shingles.

2. As an article of manufacture, a shingle group comprising a plurality of spaced shingles placed edge to edge united by pairs of metallic unions independent of the material of the shingles attached to contiguous edges of the shingles, said unions being pliable where they cross the spaces between adjacent shingles.

3. The article as in claim 1 wherein each union comprises a pair of clipping plates and a connecting strip secured between them.

4. The article as in claim 1 wherein each union comprises a pair of clipping plates, each having an opening through which one end of a connecting strip is passed.

5. The article as in claim 1 wherein each union comprises a pair of clipping plates, each having a slot and struck up catches, and a connecting strip whose ends pass through the two slots and engage the catches on the two clipping plates.

6. As an article of manufacture, a connecting strip for individual shingle units comprising a pair of clipping plates and a flexible connecting strip secured between them.

7. As an article of manufacture, a shingle group composed of separate spaced shingles united edge to edge by means of metal clips bridging the spaces between them.

8. As an article of manufacture, a shingle group composed of separate shingles united in a series by unions adapted to be removed after the shingles are laid.

In testimony whereof I have hereto set my hand on this 28th day of March, 1922.

EDWARD J. WILLIAMS.